(12) United States Patent
Li et al.

(10) Patent No.: US 10,620,524 B2
(45) Date of Patent: Apr. 14, 2020

(54) PROJECTION SYSTEM

(71) Applicant: Appotronics Corporation Limited, Shenzhen (CN)

(72) Inventors: Yi Li, Shenzhen (CN); Fei Hu, Shenzhen (CN); Zuqiang Guo, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 0 days.

(21) Appl. No.: 16/306,780

(22) PCT Filed: Apr. 19, 2017

(86) PCT No.: PCT/CN2017/081161
§ 371 (c)(1),
(2) Date: Dec. 3, 2018

(87) PCT Pub. No.: WO2017/206614
PCT Pub. Date: Dec. 7, 2017

(65) Prior Publication Data
US 2019/0129295 A1  May 2, 2019

(30) Foreign Application Priority Data

Jun. 1, 2016 (CN) .......................... 2016 1 0379125

(51) Int. Cl.
| | | |
|---|---|---|
| *H04N 9/31* | (2006.01) | |
| *G03B 21/28* | (2006.01) | |
| *G03B 21/00* | (2006.01) | |

(52) U.S. Cl.
CPC .............. *G03B 21/28* (2013.01); *G03B 21/00* (2013.01); *G03B 21/008* (2013.01); *H04N 9/312* (2013.01);
(Continued)

(58) Field of Classification Search
CPC .... H04N 9/312; H04N 9/3167; H04N 9/3182; G03B 21/28; G03B 21/00; G03B 21/008
(Continued)

(56) References Cited

U.S. PATENT DOCUMENTS 9,033,521 B2    5/2015  Chen et al.
2002/0149852 A1*  10/2002  Dubinovsky ........ H04N 9/3114
                                                                359/618
(Continued)

FOREIGN PATENT DOCUMENTS

CN          103676426 A       3/2014
CN          105573033 A       5/2016
(Continued)

OTHER PUBLICATIONS

International Search Report for Application No. PCT/CN2017/081161, dated Jun. 21, 2017, 2 pages.

*Primary Examiner* — Michael Lee
(74) *Attorney, Agent, or Firm* — Seed Intellectual Property Law Group LLP (57) ABSTRACT

A projection system has a light source, a spatial light modulator, a light recycling system, and a lens assembly. The light source emits source light toward the spatial light modulator. The spatial light modulator modulates, according to an image signal, light incident on the spatial light modulator, so as to form projection light and non-projection light. The light recycling system receives at least a portion of the non-projection light, and guides the at least a portion of the non-projection light toward the spatial light modulator. The lens assembly receives and emits the projection light to form a projection image. The projection system of the present disclosure enables efficient use of non-projection light.

24 Claims, 6 Drawing Sheets

(52) U.S. Cl.
CPC ......... *H04N 9/3167* (2013.01); *H04N 9/3182* (2013.01)

(58) Field of Classification Search
USPC .......................................... 348/760
See application file for complete search history.

(56) References Cited

U.S. PATENT DOCUMENTS

| | | | | |
|---|---|---|---|---|
| 2005/0179978 A1* | 8/2005 | Lee | .................... | G02B 27/1033 359/237 |
| 2007/0053074 A1* | 3/2007 | Krijn | ................. | G02B 26/0833 359/726 |
| 2007/0091283 A1* | 4/2007 | Chen | ....................... | H01L 31/04 353/99 |
| 2008/0246705 A1* | 10/2008 | Russell | ............. | G02B 26/0833 345/82 |
| 2009/0009730 A1* | 1/2009 | Destain | ................. | G03B 21/28 353/84 |

FOREIGN PATENT DOCUMENTS

| | | |
|---|---|---|
| JP | 2004-309786 A | 11/2004 |
| JP | 2007-072031 A | 3/2007 |

* cited by examiner

PROJECTION SYSTEM

BACKGROUND

Technical Field

The present disclosure relates to the field of projection technology, and in particular, to a projection system.

Description of the Related Art

DLP (Digital Light Procession) projection technology has been widely used because of its high contrast ratio, long service life, and high fill factors. In DLP projection technology, a light source emits three-color light having R (red), G (green), B (blue) (or having more colors like R (red), G (green), B (blue), and W (white)) light in a time sequence. Light of various colors is projected to a DMD (Digital Micro-mirror Device) chip, and the DMD chip reflects light of different colors to a projection screen after receiving a control signal from the DLP control system so as to form an image.

The DMD chip has hundreds of thousands or even millions of micro-mirrors, and typically one micro-mirror corresponds to one pixel. A rotation device is disposed below each micro-mirror. Under the control of a digital drive signal outputted by the DLP control system, a micro-mirror may flip between an on state and an off state. The flipping rate of the micro-mirror can be several thousands of times per second.

Figure 1:
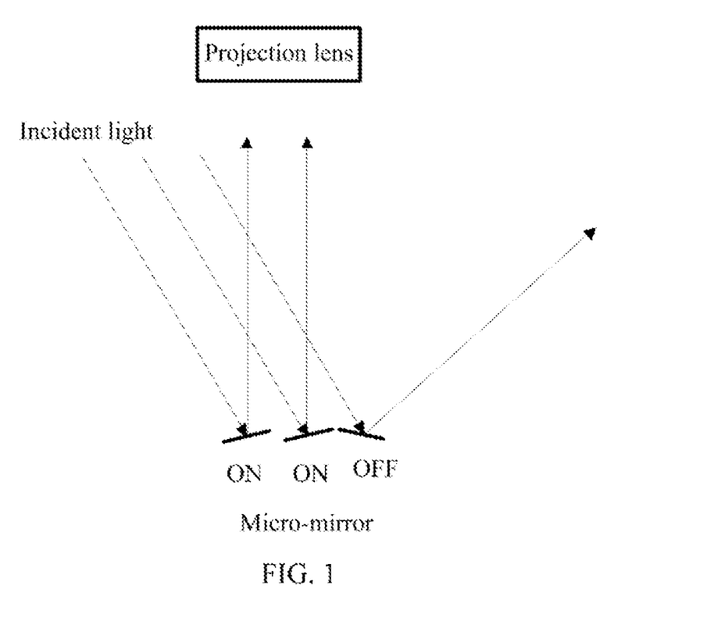
FIG. 1 is a schematic diagram of modulating incident light by a micro-mirror unit of a digital micro-mirror device.

As shown in FIG. 1, when the micro-mirror is in an on state, it reflects incident light to a projection lens so as to finally emit the light as an image. When the micro-mirror is in an off state, the incident light is reflected to an area outside the projection lens, and is absorbed by a housing of a projector or lost by being reflected back and forth inside the housing. The DLP control system controls, according to gray scale values of pixels in the image frame data, the number of times (total duration) that the corresponding micro-mirror is in the ON state, and the number of times (total duration) that each micro-mirror is in the ON state determines brightness of corresponding pixels on the projection screen.

In an image modulation process, each micro-mirror of the DMD chip in the ON state reflects the incident light to the projection lens to form projection light. The DMD chip also loses considerable intensity of light from the reflection of each micro-mirror in the OFF state. The non-projection light is not efficiently used.

The problem that the non-projection light is not used efficiently exists not only in the case where the spatial light modulator is a digital micro-mirror device, but also in a projection system using other spatial light modulators.

BRIEF SUMMARY

The present disclosure provides a projection system that can efficiently use non-projection light.

A projection system comprises a light source, a spatial light modulator, a light recycling system, and a lens assembly, wherein the light source is configured to emit source light toward the spatial light modulator;

the spatial light modulator is configured to modulate, according to an image signal, light incident to the spatial light modulator to form projection light and non-projection light;

the light recycling system is configured to receive at least a portion of the non-projection light and guide the at least a portion of the non-projection light toward the spatial light modulator; and the lens assembly is configured to receive and emit the projection light to form a projection image.

In the above projection system, the light recycling system receives at least a portion of the non-projection light and guides the at least a portion of the non-projection light to the spatial light modulator, so that the non-projection light is also modulated by the spatial light modulator. The non-projection light is therefore used effectively and efficiently.

In at least one embodiment, the source light is incident to the spatial light modulator from a light-incident side of the spatial light modulator;

the spatial light modulator modulates, according to the image signal, light incident from the light-incident side to form the projection light and the non-projection light; and the light recycling system guides at least a portion of the non-projection light to be incident to the spatial light modulator from the light-incident side of the spatial light modulator.

In at least one embodiment, the spatial light modulator is a digital micro-mirror device;

the source light is incident to the digital micro-mirror device from a light-incident side of the digital micro-mirror device;

the digital micro-mirror device modulates, according to the image signal, light incident from the light-incident side of the digital micro-mirror device, wherein a micro-mirror unit of the digital micro-mirror device in an on state reflects at least a portion of the incident light to form on-state light used as the projection light, and a micro-mirror unit of the digital micro-mirror device in an off-state reflects at least a portion of the incident light to form off-state light that is not used as the projection light;

the light recycling system collects the off-state light that is reflected by the off-state micro-mirror unit of the digital micro-mirror device and changes an optical path of the off-state light so as to form recycled light that is projected to the digital micro-mirror device along the light-incident side; and the lens assembly is located in an optical path of the on-state light that is reflected by the on-state micro-mirror unit of the digital micro-mirror device, and projects the on-state light, e.g., to a screen, to form an image, e.g., a projection image.

In the above projection system, the light recycling system collects the off-state light that is reflected by the off-state micro-mirror unit of the digital micro-mirror device and changes an optical path of the off-state light so as to form recycled light that is projected to the digital micro-mirror device along the light-incident side of the digital micro-mirror device. The recycled light is further modulated by the digital micro-mirror device, rather than being absorbed by the housing of the projector or reflected back and forth in the projector to form stray light. Therefore, the light reflected by the off-state micro-mirror unit of the digital micro-mirror device is used efficiently.

In at least one embodiment, the source light and the recycled light are incident to the digital micro-mirror device along the same path.

In the projection system of this embodiment, the source light and the recycled light are incident to the digital micro-mirror device along the same path.

The brightness of the source light can be strengthened, which in turn strengthens the brightness of the projection image.

In at least one embodiment, the light recycling system comprises:

a polarization light combining element located at the light-incident side of the digital micro-mirror device;

an optical path conversion component configured to change an optical path of the off-state light that is reflected by the off-state micro-mirror unit of the digital micro-mirror device, so as to enable the off-state light to be incident to the polarization light combining element;

an off-state light polarization conversion device configured to convert the off-state light into light having a first polarization state before the off-state light is incident to the polarization light combining element;

wherein the polarization light combining element is configured to combine light of the source light in a second polarization state and the off-state light in the first polarization state, and guide the combined light to be incident to the digital micro-mirror device.

In at least one embodiment, the source light is light in the second polarization state, and a polarization direction of the light in the first polarization state is perpendicular to that of light in the second polarization state.

In at least one embodiment, the projection system further comprises a source light polarization conversion device configured to convert the source light into light having the second polarization state before the source light is incident to the polarization light combining element.

In at least one embodiment, the source light is incident to the digital micro-mirror device along a first path, and the recycled light is incident to the digital micro-mirror device along a second path.

In at least one embodiment, the light recycling system comprises:

a first reflector located at the light-incident side of the digital micro-mirror device; and a second reflector configured to reflect the off-state light that is reflected by the off-state micro-mirror unit of the digital micro-mirror device to the first reflector;

wherein the first reflector is configured to reflect the off-state light to form the recycled light.

In at least one embodiment, the lens assembly comprises a first lens assembly and a second lens assembly;

the on-state micro-mirror unit of the digital micro-mirror device reflects at least a portion of the source light along a third path to form first on-state light;

the on-state micro-mirror unit of the digital micro-mirror device reflects at least a portion of the recycled light along a fourth path to form second on-state light;

the first lens assembly is located in an optical path of the first on-state light and projects the first on-state light, e.g., to a screen, to form an image; and the second lens assembly an optical path of the second on-state light and projects the second on-state light, e.g., to the screen, to form an image.

In at least one embodiment, the first lens assembly and the second lens assembly project the first on-state light and the second on-state light respectively to the same area to form a combined image.

In the projection system of this embodiment, after modulation, the recycled light and the source light are projected to the same area to form the combined image so as to strengthen the brightness of the projected image.

In at least one embodiment, the first lens assembly and the second lens assembly project the first on-state light and the second on-state light respectively to different areas to form two images.

In the projection system of this embodiment, the light reflected by the off-state micro-mirror of the digital micro-mirror device may be used efficiently to form two images, possibly two independent images.

In at least one embodiment, the light recycling system comprises an optical fiber, wherein one end of the optical fiber is located at an emitting side of the non-projection light and is configured to receive the non-projection light, and the other end of the optical fiber is located at the light-incident side of the spatial light modulator and is configured to emit at least a portion of the non-projection light to the spatial light modulator.

In at least one embodiment, the projection system further comprises a control unit, configured to parse a quantity of bright pixels in an image frame corresponding to the image signal, obtain a proportion of the quantity of the bright pixels to a total amount of pixels in the image frame, and control the light recycling system according to the proportion, so that the light recycling system does not form the recycled light when the proportion is less than a first threshold, and forms the recycled light when the proportion is greater than or equal to the first threshold, wherein a gray scale value of a bright pixel is greater than a second threshold.

Since the off-state light that is reflected by the off-state micro-mirror unit of the digital micro-mirror device is recycled, a portion of the off-state light is modulated by the on-state micro-mirror unit to form a projection image, while the other portion of the off-state light is again recycled; and the process is repeated. The overall process is that the off-state light that is reflected by the off-state micro-mirror unit is recycled to be distributed to the on-state micro-mirror unit, so as to form a projection image. If the quantity of the relatively bright pixels of the image frame is too small, at a certain point during the modulation process of the image frame, the quantity of the on-state micro-mirror units of the digital micro-mirror device will also be too small; and the relatively large amount of the off-state light that is reflected by the off-state micro-mirrors is distributed onto a small number of on-state micro-mirror units, which may cause the projection image to be too bright. The projection system of this embodiment may effectively reduce the amount of the projection images that are too bright.

In at least one embodiment, the projection system further comprises a control unit configured to parse a quantity of bright pixels in an image frame corresponding to the image signal, obtain a proportion of the quantity of the bright pixels to a total amount of pixels in the image frame, and control, according to the proportion, time of forming the recycled light by the light recycling system during a modulation period of the image frame, wherein the higher the proportion, the longer the time lasts for the light recycling system to form the recycled light during the modulation period of the image frame.

The projection system of this embodiment may effectively reduce the amount of the projection images that are too bright.

In at least one embodiment, the projection system further comprises a control unit configured to control the light recycling system according to a color that the image frame corresponding to the image signal is in, so that the light recycling system forms the recycled light when the image frame is in a specific color, and does not form the recycled light when the image frame is not in the specific color.

In at least one embodiment, the specific color is red.

In this embodiment, when the image frame is in red color, the projection system recycles the off-state light to increase the brightness of the projection image, thereby effectively resolving a problem when the red light has insufficient brightness.

In at least one embodiment, the light recycling system comprises a drive device, wherein the drive device drives, under the control of the control unit, an optical component of the light recycling system to be in a first state so that the light recycling system does not form the recycled light; or drives, under the control of the control unit, an optical component of the light recycling system to be in a second state so that the light recycling system forms the recycled light.

BRIEF DESCRIPTION OF THE SEVERAL VIEWS OF THE DRAWINGS

In order to more clearly illustrate embodiments of the present disclosure, the drawings which need to be used in the embodiments are simply introduced below. Obviously, the drawings described below are merely some embodiments of the present disclosure, and a person of ordinary skills in the art can also obtain other drawings according to the structures shown in these drawings and described herein without creative efforts.

Implementation of objectives, functional features, and advantages of the present disclosure will be further described with reference to the accompanying drawings.

DETAILED DESCRIPTION

The technical solutions in the embodiments of the present disclosure are clearly and completely described in the following with reference to the accompanying drawings of the embodiments of the present disclosure. Obviously, the described embodiments are merely exemplary embodiments of the present disclosure, and do not include all possible embodiments. The technical solutions of the various embodiments of the present disclosure can be combined with one another without conflicts. Technical solutions obtained by combining technical features of different embodiments are also within the scope of the present disclosure on the premise that a person skilled in the art can achieve the disclosure without creative efforts. Based on the embodiments in the present disclosure, all other embodiments obtained by a person skilled in the art by simple modifications without any inventive efforts are within the scope of the present disclosure.

In at least one embodiment, the present disclosure provides a projection system 100.

Figure 2:
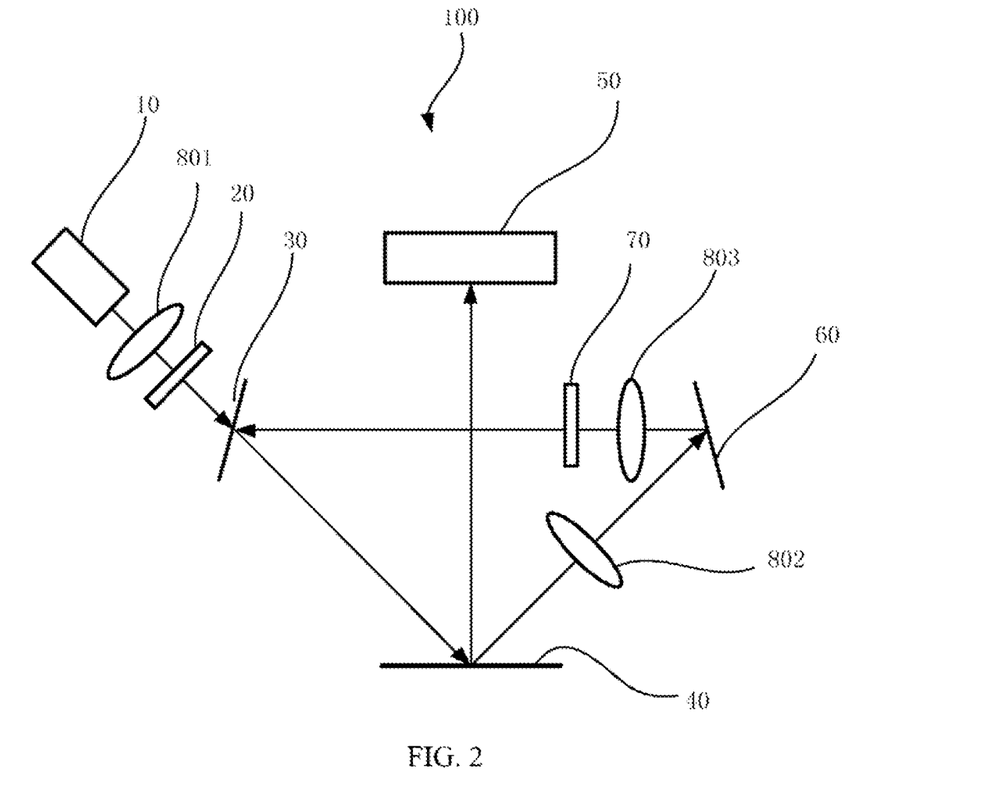
FIG. 2 is a schematic structural diagram of a projection system according to an embodiment of the present disclosure.

As shown in FIG. 2, the projection system 100 includes a light source 10, a source light polarization conversion device 20, a polarization light combining element 30, a digital micro-mirror device 40, a lens assembly 50, an optical path conversion component 60, and an off-state light polarization conversion device 70.

The light source 10 is used to emit source light.

The source light polarization conversion device 20 is used to convert the source light into light having a second polarization state before the source light is incident to the polarization light combining element 30. In at least one embodiment, the source light polarization conversion device 20 may transmit light in the second polarization state, and converts light in a first polarization state into light in the second polarization state. In one at least embodiment, the source light polarization conversion device 20 may be a system composed of a polarizer (for example, a linear polarizer, a rotation polarizer, etc.) and a liquid crystal phase variable retarder.

The polarization light combining element 30 is located at a light-incident side of the digital micro-mirror device 40, and the source light in the second polarization state is transmitted by the polarization light combining element and is incident to the digital micro-mirror device 40.

The source light is incident to the digital micro-mirror device 40 from the light-incident side of the digital micro-mirror device 40.

The digital micro-mirror device 40 is used to modulate, according to the image signal, source light incident from the light-incident side of the digital micro-mirror device 40, wherein an on-state micro-mirror unit of the digital micro-mirror device 40 reflects at least a portion of the source light to form on-state light, and an off-state micro-mirror unit of the DMD reflects at least a portion of the source light to form off-state light. An image signal is a modulated pulse formed according to image frame data. The image frame data includes a gray scale value corresponding to each pixel in the image frame. Each image frame has a specified modulation period. The image signal is used to control the micro-mirror units of the digital micro-mirror device to modulate the incident light during the modulation period, so that pixel brightness of the projection image after modulation matches a gray scale value of a corresponding pixel in the image frame.

The lens assembly 50 is located in an optical path of the on-state light that is reflected by the on-state micro-mirror unit(s) of the digital micro-mirror device 40, and projects the on-state light, e.g., to a screen (not shown in the figure), to form an image.

The optical path conversion component 60 is configured to change an optical path of the off-state light that is reflected by the off-state micro-mirror unit(s) of the digital micro-mirror device 40, so as to enable the off-state light to be incident to the polarization light combining element 30.

The off-state light polarization conversion device 70 is configured to convert the off-state light into light having a first polarization state before the off-state light is incident to the polarization light combining element 30. In at least one embodiment, the off-state light polarization conversion device 70 may transmit light in the first polarization state, and convert the light in the second polarization state into light in the first polarization state. In at least one embodiment, the off-state light polarization conversion device 70 may be a system composed of a polarizer (for example, a linear polarizer, a rotation polarizer, etc.) and a liquid crystal phase variable retarder.

The polarization light combining element 30 reflects the converted off-state light in the first polarization state to form recycled light, and the recycled light and the source light are incident to the digital micro-mirror device 40 along the same path.

Further, the on-state micro-mirror unit of the digital micro-mirror device 40 reflects at least a portion of the recycled light to form on-state light, and an off-state micro-mirror unit of the digital micro-mirror device 40 reflects at least a portion of the recycled light to form the off-state light.

The on-state light is projected by the lens assembly 50, e.g., to a screen, to form an image, while the off-state light is further recycled for reuse.

As shown in FIG. 2, the projection system 100 of this embodiment further includes a first relay system 801, a second relay system 802, and a third relay system 803. The first relay system 801, the second relay system 802, and the third relay system 803 perform one or several processing steps of converging, homogenizing, shaping (changing the spot shape), and changing a divergence angle on beams. In other embodiments, a person skilled in the art may remove one or more of the first relay system 801, the second relay system 802, and the third relay system 803 according to actual requirements, or may add other relay systems.

In at least one embodiment, the source light polarization conversion device 20 converts the source light into light having the second polarization state. In at least one embodiment, the source light is in the second polarization state, and the source light polarization conversion device 20 may be omitted.

In this embodiment, the polarization light combining element 30 transmits the source light in the second polarization state and reflects the recycled light in the first polarization state. In other embodiments, the polarization light combining element may also reflect the source light in the second polarization state and transmit the recycled light in the first polarization state. Embodiments with the following technical features all fall within the protection scope of the present disclosure: the polarization light combining element is configured to combine light of the source light that is in a second polarization state and the off-state light that is in the first polarization state, and guide the combined light to be incident to the digital micro-mirror device. It will be readily apparent to those skilled in the art that in a particular embodiment, the optical path formed by the optical path conversion component and the optical path of the source light may be modified adequately to accommodate the characteristics of the polarization light combining element.

In this embodiment, the polarization light combining element 30 is used to enable, by using a polarization light combining method, the source light and the recycled light to be incident to the digital micro-mirror device along the same path. In other embodiments, a person skilled in the art may also use other ways to enable the source light and the recycled light to be incident to the digital micro-mirror device along the same path, which is not limited by the present disclosure.

FIG. 2 only shows a reflector as the optical path conversion component 60. In other embodiments, the optical path conversion component 60 may include multiple reflectors.

In at least one embodiment, a polarization direction of light in the first polarization state is perpendicular to that of light in the second polarization state. In at least one embodiment, the first polarization state may be an S polarization state and the second polarization state may be a P polarization state, or the first polarization state may be a P polarization state and the second polarization state may be an S polarization state.

In at least one embodiment, the light source 10 emits light of different colors in a time sequence; for example, the light source 10 emits light of three basic colors, red, green, and blue in a time sequence. In at least one embodiment, the light source 10 includes an LED and a filter wheel. The LED emits white light. The filter wheel consists of multiple sections with each section allowing only one single color of white light to pass through, and multiple sections are located, in a time sequence, on an optical path of the white light emitted by the LED, so that the light source 10 emits, in a time sequence, light of different colors passing through the sections. In another embodiment, the light source 10 includes a laser and a fluorescent wheel. The laser emits laser light, and the fluorescent wheel consists of multiple sections. Phosphors of different colors are provided on each section, and multiple sections are located, in a time sequence, on an optical path of the laser light emitted by the LED. The laser light excites the phosphors of different colors to generate the fluorescent light with corresponding colors, so that the light source 10 emits light of different colors in a time sequence. A wavelength of the laser light is shorter than that of the fluorescent light. In at least one embodiment, a certain section or less than two sections of the fluorescent wheel may be set as transparent sections, so that the laser light emitted by the laser becomes one of the different color light emitted by the light source 10 in a time sequence. In other embodiment, a combination of other solid light sources and the fluorescent wheel is also plausible.

Figure 3:
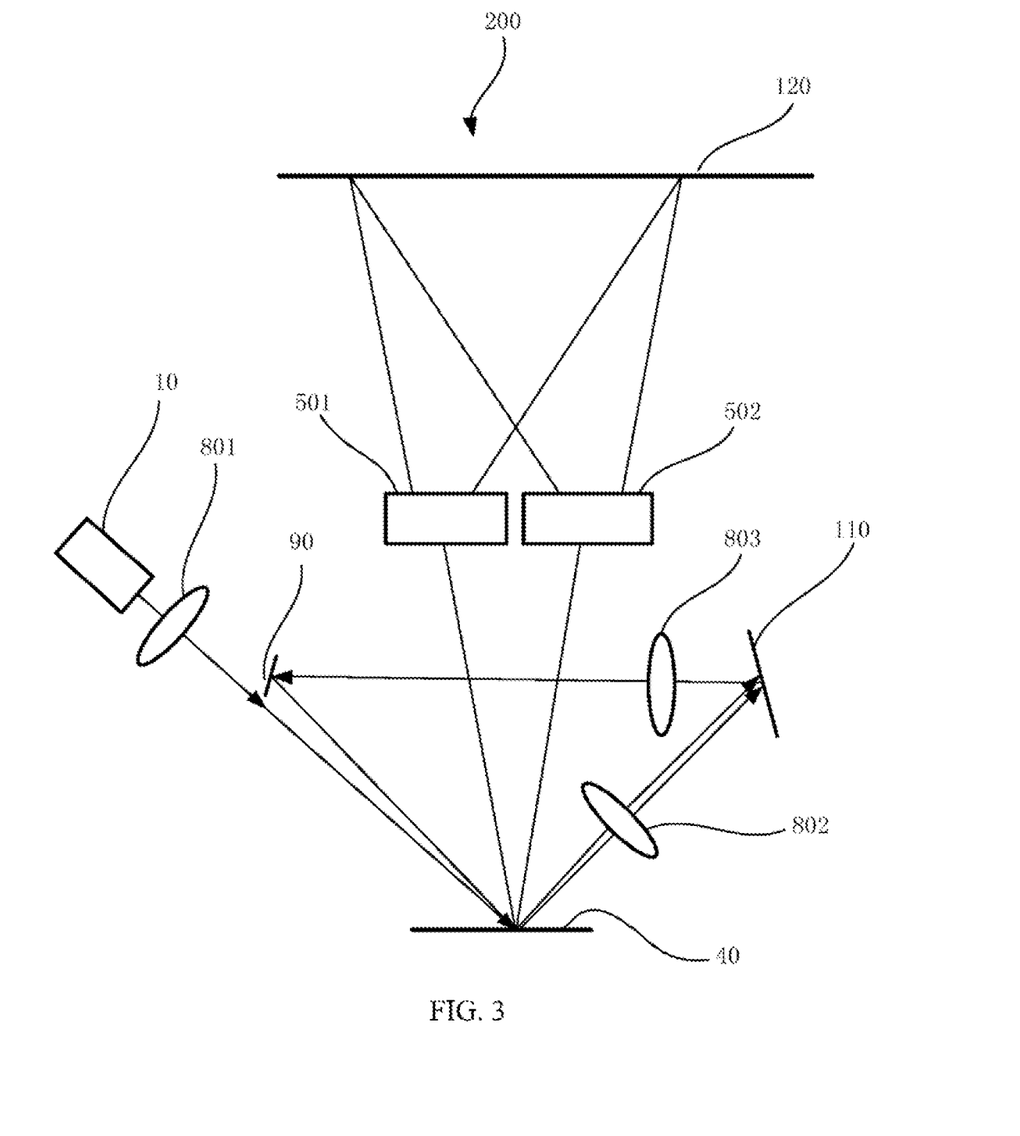
FIG. 3 is a schematic structural diagram of another projection system according to an embodiment of the present disclosure.

As shown in FIG. 3, in at least one embodiment, a projection system 200 includes a light source 10, a digital micro-mirror device 40, a first lens assembly 501, a second lens assembly 502, a first reflector 90, and a second reflector 110.

The light source 10 is used to emit source light.

From the light-incident side of the digital micro-mirror device 40, the source light is incident to the digital micro-mirror device 40.

The digital micro-mirror device 40 is used to modulate, according to the image signal, source light incident from the light-incident side of the digital micro-mirror device 40, wherein an on-state micro-mirror unit of the digital micro-mirror device 40 reflects at least a portion of the source light along a third path to form first on-state light, and an off-state micro-mirror unit of the digital micro-mirror device 40 reflects at least a portion of the source light to form off-state light.

The first lens assembly 501 is located in an optical path of the first on-state light and projects the first on-state light, e.g., to a screen 120, to form an image.

The first reflector 90 is located at a light-incident side of the digital micro-mirror device 40.

The second reflector 110 is configured to reflect the off-state light that is reflected by the off-state micro-mirror unit of the digital micro-mirror device 40 to the first reflector 90.

The first reflector 90 is configured to reflect the off-state light to form recycled light.

Further, the on-state micro-mirror unit of the digital micro-mirror device 40 reflects at least a portion of the recycled light along a fourth path to form second on-state light.

The second lens assembly 502 is located in an optical path of the second on-state light and projects the second on-state light, e.g., to the screen 120, to form an image.

The off-state micro-mirror unit of the digital micro-mirror device 40 reflects at least a portion of the recycled light to form the off-state light, and the off-state light is further recycled for reuse.

As shown in FIG. 3, the projection system 200 of this embodiment further includes a first relay system 801, a second relay system 802, and a third relay system 803. The first relay system 801, the second relay system 802, and the third relay system 803 perform one or several processing steps of converging, homogenizing, shaping (changing the spot shape), and changing a divergence angle on beams. In other embodiments, a person skilled in the art may remove one or more of the first relay system 801, the second relay system 802, and the third relay system 803 according to actual requirements, or may add other relay systems.

In this embodiment, a first path where the source light is incident to the digital micro-mirror device 40 is different from a second path where the recycled light is incident to the digital micro-mirror device 40, and an inclined angle between the first path and the second path is within a preset angle range. In this embodiment, the first reflector 90 and the second reflector 110 are used to guide the recycled light to the digital micro-mirror device 40 along the second path different from the first path. In other embodiments, a person skilled in the art may also use other ways to enable the recycled light to be incident to the digital micro-mirror device 40 along the second path different from the first path, which is not limited by the present disclosure.

FIG. 3 only shows an optical element as the first reflector 90 and shows an optical element as the second reflector 110. However, the first reflector 90 may include a combination of multiple reflectors, and the second reflector 110 may also include a combination of multiple reflectors, which is not limited by the present disclosure.

Figure 4:
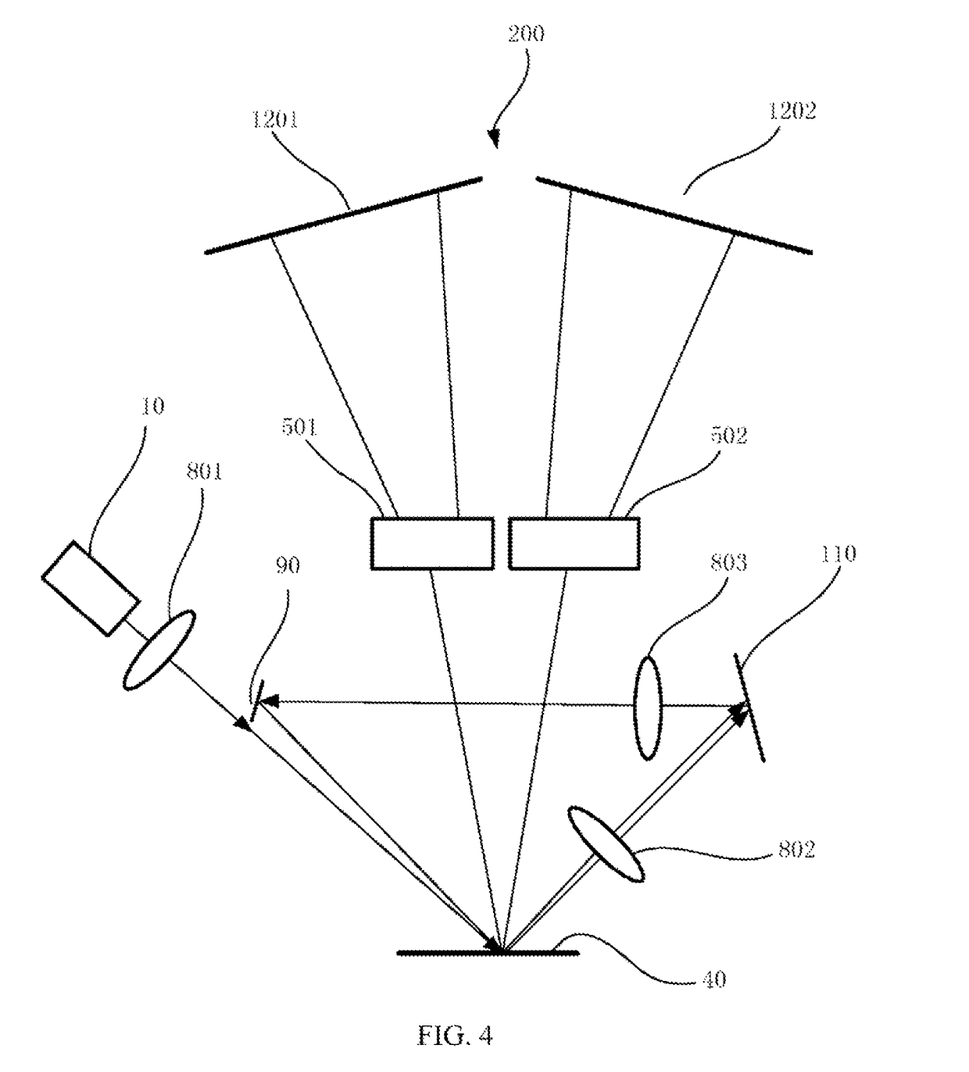
FIG. 4 is a schematic diagram of forming two projection images by a projection system according to an embodiment of the present disclosure.

In this embodiment, as shown in FIG. 3, the first lens assembly 501 and the second lens assembly 502 project the first on-state light and the second on-state light to the same area to form a combined image. In other embodiments, the first lens assembly 501 and the second lens assembly 502 project the first on-state light and the second on-state light to different areas to form two images. In at least one embodiment, the two images may be located on the same screen, or different screens. FIG. 4 illustrates a case where the first lens assembly 501 and the second lens assembly 502 project the first on-state light and the second on-state light to different screens 1201 and 1202 to form two images.

In the above embodiment, the on-state light that is reflected by the on-state micro-mirror unit of the digital micro-mirror device is projected by the lens assembly, e.g., to the screen, to form an image so that the on-state light is used as projection light (the projection light may be seen as light emitted by the lens assembly to form a projection image) and the off-state light that is reflected by the off-state micro-mirror unit of the digital micro-mirror device is not used as projection light.

Although the above describes that the digital micro-mirror device 40 modulates the source light first and then the recycled light, fast light speeds makes the digital micro-mirror device 40 modulate both the source light and the recycled light almost simultaneously. It may be understood that the digital micro-mirror device modulates, according to the image signal, light incident from the light-incident side of the digital micro-mirror device 40, wherein an on-state micro-mirror unit of the digital micro-mirror device 40 reflects at least a portion of the incident light to form on-state light that is used as projection light, and an off-state micro-mirror unit of the digital micro-mirror device 40 reflects the at least a portion of the incident light to form off-state light that is not used as projection light. Light incident on the light-incident side of the digital micro-mirror device 40 includes the source light and the recycled light.

In the embodiment shown in FIG. 2, the combination of a the polarization light combining element 30, the optical path conversion component 60, and the off-state light polarization conversion device 70 is equivalent to a light recycling system, which collects the off-state light that is reflected by the off-state micro-mirror unit of the digital micro-mirror device 40 and changes an optical path, so as to form recycled light projected along the light-incident side to the digital micro-mirror device 40. In the embodiment shown in FIG. 3, the combination of the first reflector 90 and the second reflector 110 is equivalent to the light recycling system, which collects the off-state light that is reflected by the off-state micro-mirror unit of the digital micro-mirror device 40 and changes an optical path, so as to form recycled light projected along the light-incident side of the digital micro-mirror device 40 to the digital micro-mirror device 40.

In an embodiment, the light recycling system includes an optical fiber. One end of the optical fiber is located at an emitting side of the off-state light that is reflected by the off-state micro-mirror unit of the digital micro-mirror device 40 and is configured to receive the off-state light, and the other end of the optical fiber is located at a light-incident side of the digital micro-mirror device 40 and is configured to emit the off-state light to the digital micro-mirror device 40 so as to form recycled light.

The present disclosure is not limited to the implementation in the above embodiment in which the light recycling system recycles the off-state light that is reflected by the off-state micro-mirror unit of the digital micro-mirror device 40. It is also possible to recycle with other light recycling systems. Projection systems with the following technical features are within the protection scope of the present disclosure: a projection system comprising a light source used to emit source light; a digital micro-mirror device, configured to modulate, according to an image signal, source light incident from the light-incident side of the digital micro-mirror device, wherein an on-state micro-mirror unit of the digital micro-mirror device reflects at least a portion of the source light to form on-state light, and an off-state micro-mirror unit of the digital micro-mirror device reflects at least a portion of the source light to form off-state light; a light recycling system configured to collect the off-state light that is reflected by the off-state micro-mirror unit of the digital micro-mirror device and change an optical path so as to form recycled light projected along the light-incident side of the digital micro-mirror device to the digital micro-mirror device. The off-state micro-mirror unit of the digital micro-mirror device reflects at least a portion of the recycled light to form off-state light. The lens assembly is located in an optical path of the on-state light that is reflected by the on-state micro-mirror unit of the digital micro-mirror device, and configured to project the on-state light, e.g., to a screen, to form an image.

The projection system in the above embodiment re-projects the non-projection light formed by the digital micro-mirror device to the digital micro-mirror device, so that the non-projection light can be reused by the digital micro-mirror device. However, the present disclosure is not limited to the implementation where the spatial light modulator is a digital micro-mirror device. Implementations of having non-projection light formed by other spatial light modulators recycled and re-projected to the spatial light modulator for reuse are also within the protection scope of the present disclosure.

In addition, in the above embodiment, source light is incident to a spatial light modulator from a light-incident side of a spatial light modulator, the spatial light modulator modulates, according to an image signal, light incident from a light-incident side of the spatial light modulator so as to form projection light and non-projection light, and a light recycling system guides at least a portion of the non-projection light to be incident to the spatial light modulator from the light-incident side of the spatial light modulator. However, the present disclosure does not limit the incident direction of the source light to the spatial light modulator, and does not limit the direction for the light recycling system to guide the at least a portion of the non-projection light to be incident to the spatial light modulator.

All projection systems with the following technical features are also within the protection scope of the present disclosure: a projection system, comprising a light source, a spatial light modulator, a light recycling system, and a lens assembly, wherein the light source is configured to emit source light towards the spatial light modulator, the spatial light modulator is configured to modulate, according to an image signal, light incident on the spatial light modulator to form projection light and non-projection light, the light recycling system is configured to receive at least a portion of the non-projection light and guide the at least a portion of the non-projection light to the spatial light modulator, and the lens assembly is configured to receive and emit the projection light to form a projection image.

In at least one embodiment, the above projection system (including projection systems 100 and 200) may further include:

a control unit (not shown) configured to parse a quantity of bright pixels in an image frame corresponding to the image signal that is modulated by the digital micro-mirror device 40, obtain a proportion of the quantity of the bright pixels to a total amount of pixels in the image frame, and control the light recycling system according to the proportion. The light recycling system therefore does not form the recycled light when the proportion is less than a first threshold and forms the recycled light when the proportion is greater than or equal to the first threshold. A gray scale value of one or more of the bright pixels is greater than a second threshold.

For example, when a proportion of the quantity of the bright pixels to the total amount of pixels in the image frame is less than 40%, the recycled light is not formed, and when the proportion is greater than or equal to 40%, the recycled light is formed.

In another embodiment, the manner for the control unit to control the light recycling system may vary. For example, the control unit may be used to parse the quantity of bright pixels in an image frame corresponding to the image signal modulated by the digital micro-mirror device 40, obtain a proportion of the quantity of the bright pixels to a total amount of pixels in the image frame, and control, according to the proportion, time of forming the recycled light by the light recycling system during a modulation period of the image frame. The higher the proportion is, the longer the time lasts for the light recycling system to form the recycled light during the modulation period of the image frame.

For example, for a first image frame and a second image frame, a proportion of the quantity of bright pixels in the first image frame to the total amount of pixels in the first image frame is a first proportion, and a proportion of the quantity of bright pixels in the second image frame to the total amount of pixels in the second image frame is a second proportion. The time of forming the recycled light by the light recycling system during a modulation period of the first image frame is first time, and the time of forming the recycled light by the light recycling system during a modulation period of the second image frame is second time. If the first proportion is greater than the second proportion, the first time is also longer than the second time.

In another embodiment, the control unit may be used to control the light recycling system according to a color that the image frame corresponding to the image signal modulated by the digital micro-mirror device 40 is in, so that the light recycling system forms the recycled light when the image frame is in a specific color, and does not form the recycled light when the image frame is not in the specific color. For example, the specific color may be red.

Technical solutions obtained from any combinations of the implementations of the control manners of the control unit in the above embodiment are also within the protection scope of the present disclosure.

In at least one embodiment, the light recycling system further includes a drive device, wherein the drive device drives, under the control of the above control unit, an optical component of the light recycling system to move into a first state so that the light recycling system does not form the recycled light; or drives, under the control of the control unit, an optical component of the light recycling system to move into a second state so that the light recycling system forms the recycled light. The drive device may be used to drive any optical element other than itself in the light recycling system to move in accordance with a manner that can change the optical path, such as rotation or translation, or a combination of rotation and translation, thereby the light recycling system may be able to form the recycled light or not form the recycled light. For example, corresponding to the projection system 100 shown in FIG. 2, the drive device may drive the polarization light combining element 30 or the optical path conversion component 60 to move in a manner that changes the optical path. For another example, corresponding to the projection system 200 shown in FIG. 3, the drive device may drive the first reflector 90 or the second reflector 110 to move in a manner that changes the optical path.

Figure 5:
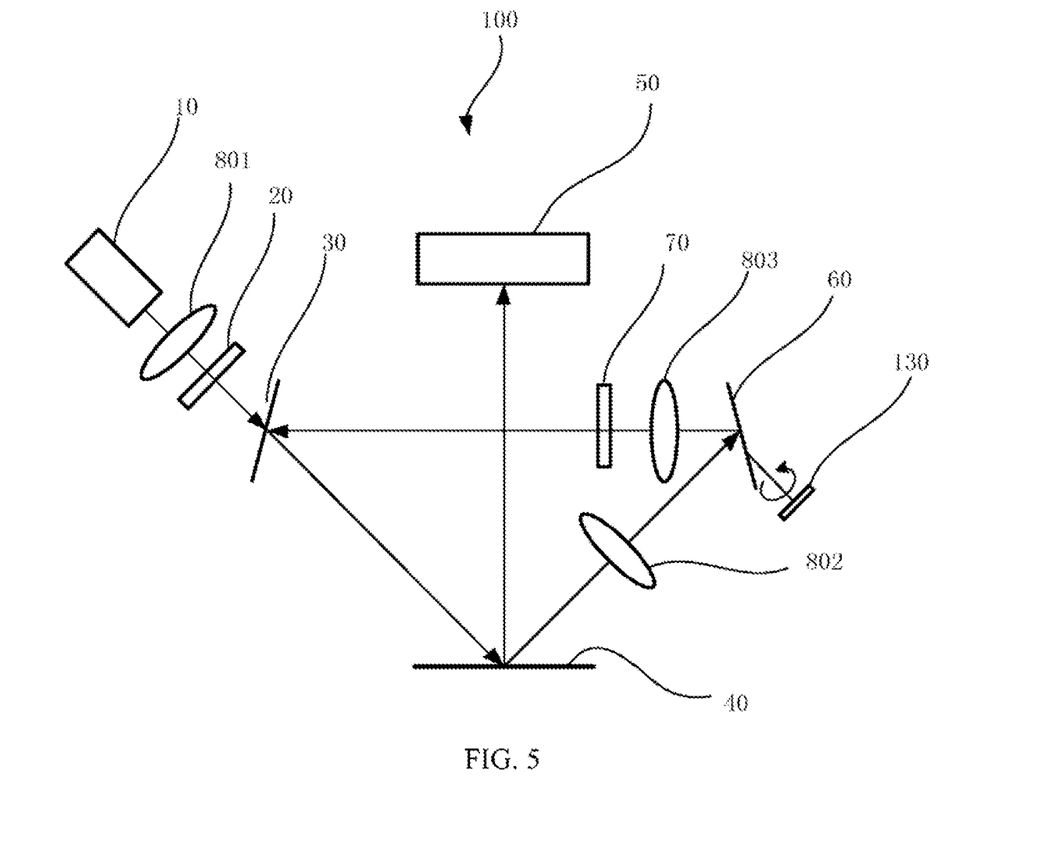
FIG. 5 is a schematic diagram of a drive device driving an optical path conversion component in the projection system to rotate so as to change an optical path according to an embodiment of the present disclosure.

FIG. 5 is a schematic diagram of a drive device 130 driving an optical path conversion component 60 in the projection system 100 to rotate so as to change an optical path. The control device is not shown in the figure. Using the optical path conversion component 60 being a plane reflector as an example, a rotation shaft of the plane reflector is not perpendicular to the plane where the plane reflector is located.

Figure 6:
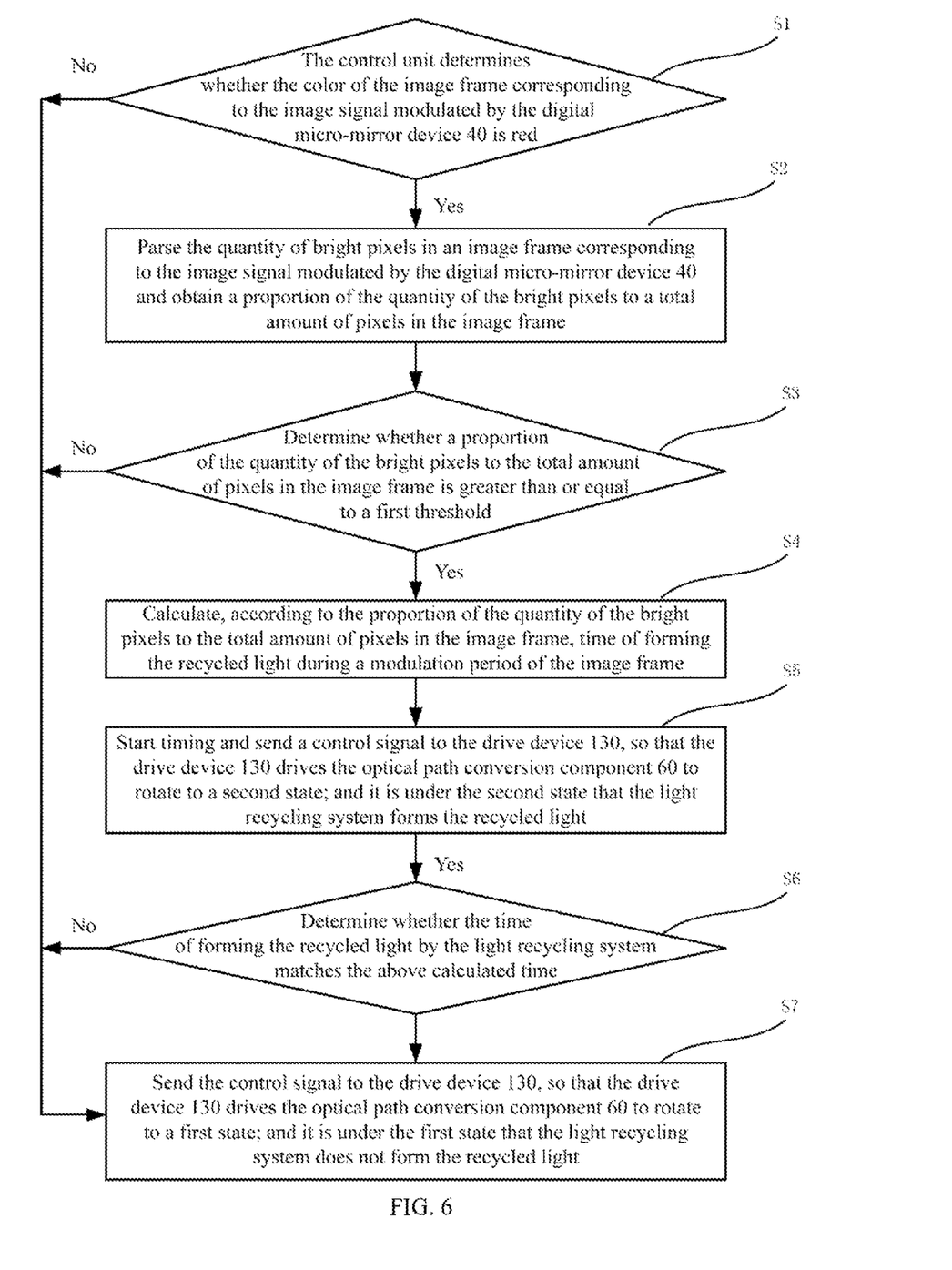
FIG. 6 is a schematic flowchart of controlling a light recycling system by a control unit according to an embodiment of the present disclosure.

Based on the projection system 100 shown in FIG. 5, FIG. 6 shows a specific flow of the control unit controlling the light recycling system.

In step S1, the control unit determines whether the color of the image frame corresponding to the image signal modulated by the digital micro-mirror device 40 is red; if so, the control unit performs step S2; otherwise, the control unit proceeds to step S7.

In step S2, the control unit parses the quantity of bright pixels in an image frame corresponding to the image signal modulated by the digital micro-mirror device 40 and obtains a proportion of the quantity of the bright pixels to a total amount of pixels in the image frame.

In step S3, the control unit determines whether a proportion of the quantity of the bright pixels to the total amount of pixels in the image frame is greater than or equal to a first threshold; if so, the control unit performs step S4; otherwise, the control unit proceeds to step S7.

In step S4, the control unit calculates, according to the proportion of the quantity of the bright pixels to the total amount of pixels in the image frame, time of forming the recycled light during a modulation period of the image frame.

In step S5, the control unit starts timing and sends a control signal to the drive device 130 so that the drive device 130 drives the optical path conversion component 60 to rotate to a second state. It is under the second state that the light recycling system forms the recycled light.

In step S6, the control unit determines whether the time of forming the recycled light by the light recycling system matches the above calculated time; if so, the control unit executes step S6 in a cycling manner; otherwise, the control unit proceeds to step S7.

In step S7, the control signal is sent to the drive device 130, so that the drive device 130 drives the optical path conversion component 60 to rotate to a first state; and when it is in the first state, the light recycling system does not form the recycled light.

The present disclosure does not limit the order of the above steps, and a person skilled in the art can change the order of the steps based on a possible manner.

In at least one embodiment, the off-state light polarization conversion device 70 may be a device having a polarization conversion function that can be controlled via voltage. A change of the voltage may cause the off-state light polarization conversion device to be in an operating or non-operating state. In the operating state, the off-state light polarization conversion device 70 may transmit light in a first polarization state, and convert light in a second polarization state into light in the first polarization state, and in the non-operating state, the off-state light polarization conversion device 70 does not transmit the light in the first polarization state, and does not convert the light in the second polarization state into light in the first polarization state.

In at least one embodiment, the control unit may control the off-state light polarization conversion device 70 to be in the operating state or a non-operating state by controlling the voltage of the off-state light polarization conversion device 70, thereby enabling the light recycling system to form or not to form the recycled light.

The above descriptions are only preferred embodiments of the present disclosure and do not limit the scope of the present disclosure. Any equivalent structure changes made according to the description and drawings of the present disclosure, or direct/indirect application to other related technical fields, all fall within the protection scope of the present disclosure.

The invention claimed is:

1. A projection system, comprising:
a light source,
a spatial light modulator,
a light recycling system, and
a lens assembly,
wherein:
the light source is configured to emit source light toward the spatial light modulator;
the spatial light modulator is configured to modulate, according to an image signal, light incident to the spatial light modulator to form projection light and non-projection light;
the light recycling system is configured to receive at least a portion of the non-projection light and guide the at least a portion of the non-projection light toward the spatial light modulator; and
the lens assembly is configured to receive and emit the projection light to form a projection image,
the projection system further comprising:
a control unit configured to parse a quantity of bright pixels in an image frame corresponding to the image signal, obtain a proportion of the quantity of the bright pixels to a total amount of pixels in the image frame, and control the light recycling system according to the proportion, so that the light recycling system does not form recycled light when the proportion is less than a first threshold, and forms the recycled light when the proportion is greater than or equal to the first threshold,
wherein a gray scale value of a bright pixel is greater than a second threshold.

2. The projection system according to claim 1, wherein:
the source light is incident to the spatial light modulator from a light-incident side of the spatial light modulator;
the spatial light modulator modulates, according to the image signal, light incident from the light-incident side to form the projection light and the non-projection light; and
the light recycling system guides at least a portion of the non-projection light to be incident to the spatial light modulator from the light-incident side of the spatial light modulator.

3. The projection system according to claim 1, wherein:
the spatial light modulator is a digital micro-mirror device;
the source light is incident to the digital micro-mirror device from a light-incident side of the digital micro-mirror device;
the digital micro-mirror device modulates, according to the image signal, light incident from the light-incident side of the digital micro-mirror device, wherein a micro-mirror unit of the digital micro-mirror device in an on state reflects at least a portion of the incident light to form on-state light used as the projection light, and a micro-mirror unit of the digital micro-mirror device in an off state reflects at least a portion of the incident light to form off-state light that is not used as the projection light;
the light recycling system collects the off-state light that is reflected by the off-state micro-mirror unit of the digital micro-mirror device and changes an optical path of the off-state light so as to form recycled light that is projected to the digital micro-mirror device along the light-incident side of the digital micro-mirror device; and
the lens assembly is located in an optical path of the on-state light that is reflected by the on-state micro-mirror unit of the digital micro-mirror device, and projects the on-state light to form the projection image.

4. The projection system according to claim 3, wherein the source light and the recycled light are incident to the digital micro-mirror device along the same path.

5. The projection system according to claim 4, wherein the light recycling system comprises:

a polarization light combining element located at the light-incident side of the digital micro-mirror device;

an optical path conversion component configured to change the optical path of the off-state light that is reflected by the off-state micro-mirror unit of the digital micro-mirror device, so as to enable the off-state light to be incident to the polarization light combining element; and an off-state light polarization conversion device configured to convert the off-state light into light having a first polarization state before the off-state light is incident to the polarization light combining element;

wherein the polarization light combining element is configured to combine light of the source light in a second polarization state and the off-state light in the first polarization state, and guide the combined light to be incident to the digital micro-mirror device.

6. The projection system according to claim 5, wherein: the source light is light in the second polarization state, and a polarization direction of the light in the first polarization state is perpendicular to that of the light in the second polarization state.

7. The projection system according to claim 5, further comprising:

a source light polarization conversion device configured to convert the source light into light having the second polarization state before the source light is incident to the polarization light combining element.

8. The projection system according to claim 3, wherein the source light is incident to the digital micro-mirror device along a first path, and the recycled light is incident to the digital micro-mirror device along a second path.

9. The projection system according to claim 8, wherein the light recycling system comprises:

a first reflector located at the light-incident side of the digital micro-mirror device; and a second reflector configured to reflect the off-state light that is reflected by the off-state micro-mirror unit of the digital micro-mirror device to the first reflector;

wherein the first reflector is configured to reflect the off-state light to form the recycled light.

10. The projection system according to claim 8, wherein: the lens assembly comprises a first lens assembly and a second lens assembly;

the on-state micro-mirror unit of the digital micro-mirror device reflects at least a portion of the source light along a third path to form first on-state light;

the on-state micro-mirror unit of the digital micro-mirror device reflects at least a portion of the recycled light along a fourth path to form second on-state light;

the first lens assembly is located in an optical path of the first on-state light and projects the first on-state light to form an image; and the second lens assembly is located in an optical path of the second on-state light and projects the second on-state light to form an image.

11. The projection system according to claim 10, wherein the first lens assembly and the second lens assembly project the first on-state light and the second on-state light respectively to the same area to form a combined image.

12. The projection system according to claim 10, wherein the first lens assembly and the second lens assembly project the first on-state light and the second on-state light respectively to different areas to form two images.

13. The projection system according to claim 2, wherein the light recycling system comprises an optical fiber, wherein one end of the optical fiber is located at an emitting side of the non-projection light and is configured to receive the non-projection light, and wherein the other end of the optical fiber is located at the light-incident side of the spatial light modulator and is configured to emit at least a portion of the non-projection light to the spatial light modulator.

14. The projection system according to claim 1, further comprising:

a control unit configured to parse a quantity of bright pixels in an image frame corresponding to the image signal, obtain a proportion of the quantity of the bright pixels to a total amount of pixels in the image frame, and control, according to the proportion, time of forming the recycled light by the light recycling system during a modulation period of the image frame;

wherein the higher the proportion is, the longer the time lasts for the light recycling system to form the recycled light during the modulation period of the image frame.

15. The projection system according to claim 1, further comprising:

a control unit configured to control the light recycling system according to a color that the image frame corresponding to the image signal is in, so that the light recycling system forms the recycled light when the image frame is in a specific color, and does not form the recycled light when the image frame is not in the specific color.

16. The projection system according to claim 15, wherein the specific color is red.

17. The projection system according to claim 1, wherein: the light recycling system comprises a drive device, wherein the drive device drives, under the control of the control unit, an optical component of the light recycling system to be in a first state so that the light recycling system does not form the recycled light; or drives, under the control of the control unit, the optical component of the light recycling system to be in a second state so that the light recycling system forms the recycled light.

18. A projection system, comprising:
a light source,
a spatial light modulator,
a light recycling system, and
a lens assembly,
wherein:
the light source is configured to emit source light toward the spatial light modulator;
the spatial light modulator is configured to modulate, according to an image signal, light incident to the spatial light modulator to form projection light and non-projection light;
the light recycling system is configured to receive at least a portion of the non-projection light and guide the at least a portion of the non-projection light toward the spatial light modulator; and
the lens assembly is configured to receive and emit the projection light to form a projection image,
the projection system further comprising:
a control unit configured to parse a quantity of bright pixels in an image frame corresponding to the image signal, obtain a proportion of the quantity of the bright pixels to a total amount of pixels in the image frame, and control, according to the proportion, time of forming recycled light by the light recycling system during a modulation period of the image frame, wherein the higher the proportion is, the longer the time lasts for the light recycling system to form the recycled light during the modulation period of the image frame.

19. A projection system, comprising:
a light source,
a spatial light modulator,
a light recycling system, and
a lens assembly,
wherein:
the light source is configured to emit source light toward the spatial light modulator;
the spatial light modulator is configured to modulate, according to an image signal, light incident to the spatial light modulator to form projection light and non-projection light;
the light recycling system is configured to receive at least a portion of the non-projection light and guide the at least a portion of the non-projection light toward the spatial light modulator; and
the lens assembly is configured to receive and emit the projection light to form a projection image,
the projection system further comprising:
a control unit configured to control the light recycling system according to a color that the image frame corresponding to the image signal is in, so that the light recycling system forms recycled light when the image frame is in a specific color, and does not form the recycled light when the image frame is not in the specific color.

20. A projection system, comprising:
a light source,
a spatial light modulator,
a light recycling system, and
a lens assembly,
wherein:
the light source is configured to emit source light toward the spatial light modulator;
the spatial light modulator is configured to modulate, according to an image signal, light incident to the spatial light modulator to form projection light and non-projection light;
the light recycling system is configured to receive at least a portion of the non-projection light and guide the at least a portion of the non-projection light toward the spatial light modulator;
the lens assembly is configured to receive and emit the projection light to form a projection image;
the spatial light modulator is a digital micro-mirror device;
the source light is incident to the digital micro-mirror device from a light-incident side of the digital micro-mirror device;
the digital micro-mirror device modulates, according to the image signal, light incident from the light-incident side of the digital micro-mirror device, wherein a micro-mirror unit of the digital micro-mirror device in an on state reflects at least a portion of the incident light to form on-state light used as the projection light, and a micro-mirror unit of the digital micro-mirror device in an off state reflects at least a portion of the incident light to form off-state light that is not used as the projection light;
the light recycling system collects the off-state light that is reflected by the off-state micro-mirror unit of the digital micro-mirror device and changes an optical path of the off-state light so as to form recycled light that is projected to the digital micro-mirror device along the light-incident side of the digital micro-mirror device; and
the lens assembly is located in an optical path of the on-state light that is reflected by the on-state micro-mirror unit of the digital micro-mirror device, and projects the on-state light to form the projection image; and
the source light is incident to the digital micro-mirror device along a first path, and the recycled light is incident to the digital micro-mirror device along a second path.

21. The projection system according to claim 20, wherein the light recycling system comprises:
a first reflector located at the light-incident side of the digital micro-mirror device; and
a second reflector configured to reflect the off-state light that is reflected by the off-state micro-mirror unit of the digital micro-mirror device to the first reflector;
wherein the first reflector is configured to reflect the off-state light to form the recycled light.

22. The projection system according to claim 20, wherein:
the lens assembly comprises a first lens assembly and a second lens assembly;
the on-state micro-mirror unit of the digital micro-mirror device reflects at least a portion of the source light along a third path to form first on-state light;
the on-state micro-mirror unit of the digital micro-mirror device reflects at least a portion of the recycled light along a fourth path to form second on-state light;
the first lens assembly is located in an optical path of the first on-state light and projects the first on-state light to form an image; and
the second lens assembly is located in an optical path of the second on-state light and projects the second on-state light to form an image.

23. The projection system according to claim 22, wherein the first lens assembly and the second lens assembly project the first on-state light and the second on-state light respectively to the same area to form a combined image.

24. The projection system according to claim 22, wherein the first lens assembly and the second lens assembly project the first on-state light and the second on-state light respectively to different areas to form two images.

* * * * *